May 11, 1965 W. M. SHIVE 3,182,918
IMPELLER MEANS FOR FOOD WASTE DISPOSER
Filed Dec. 4, 1962 2 Sheets-Sheet 1

INVENTOR.
WILLIAM M. SHIVE
BY Richard L. Caslin
HIS ATTORNEY

May 11, 1965  W. M. SHIVE  3,182,918
IMPELLER MEANS FOR FOOD WASTE DISPOSER
Filed Dec. 4, 1962  2 Sheets-Sheet 2

INVENTOR.
WILLIAM M. SHIVE
BY Richard L. Caslin
HIS ATTORNEY

3,182,918
IMPELLER MEANS FOR FOOD WASTE DISPOSER
William M. Shive, Louisville, Ky., assignor to General
Electric Company, a corporation of New York
Filed Dec. 4, 1962, Ser. No. 242,201
5 Claims. (Cl. 241—46)

The present invention relates to food waste disposer apparatus and primarily to a novel type of impeller means for use therein for reducing or comminuting food waste particles to produce a flowable mixture in the presence of water for discharging into the drain system leading from the kitchen sink.

A conventional food waste disposer apparatus includes a vertically-extending hopper means having a top access opening for receiving water and waste material therethrough. The hopper means is adapted to be suspended below the drain opening of the kitchen sink. Rotatable comminuting means are disposed adjacent the bottom of the hopper, and an electrically-driven power means is provided below the comminuting means and operatively joined thereto for driving the comminuting means. A suitable drain line is connected to a sump located beneath the comminuting means for carrying off the water-entrained food waste into the sewer system provided for the home.

A suitable comminuting assembly includes a circular flywheel and a waste impeller means mounted on the top surface of the flywheel. A preferred type of waste impeller means comprises at least one swinging impeller that is pivotally fastened to the flywheel and swings in a generally horizontal plane. Most swinging impeller designs perform well when they are new, but many of them wear out rapidly in that their cutting action decreases substantially under hard usage conditions. Another disadvantage of the prior art impeller designs is that they are rather expensive to manufacture and hence they contribute to a relatively high selling price of such a unit for consumers in the medium to low income bracket.

A principal object of the present invention is to provide a swinging impeller design for a food waste disposer apparatus where the impellers are formed out of rod-like material and may easily be shaped for optimum results.

A further object of the present invention is to provide swinging impellers of the class described formed of rod-like material which have long wearing characteristics and which produce a knife-like cutting action through relatively soft food waste.

Briefly stated, in accordance with one aspect of this invention, I have fashioned a swinging impeller design for a food waste disposer where the impeller is formed of rod-like material that is bent into a generally hairpin shape to present a pair of arms that are connected together by a bight portion. This bight portion is adapted to be pivotally fastened to a flywheel of the disposer apparatus so that the comminuting assembly operates in the manner of a hammer mill that rotates about a vertical axis. The arm of the impeller which is the leading edge, when the impeller is related to the direction of rotation of the flywheel, is an arm that has a low silhouette. The other arm which may be considered as forming the trailing edge of the impeller has a relatively high silhouette.

My invention will be better understood from the following description taken in conjunction with the accompanying drawings and its scope will be pointed out in the appended claims.

Figure 1:
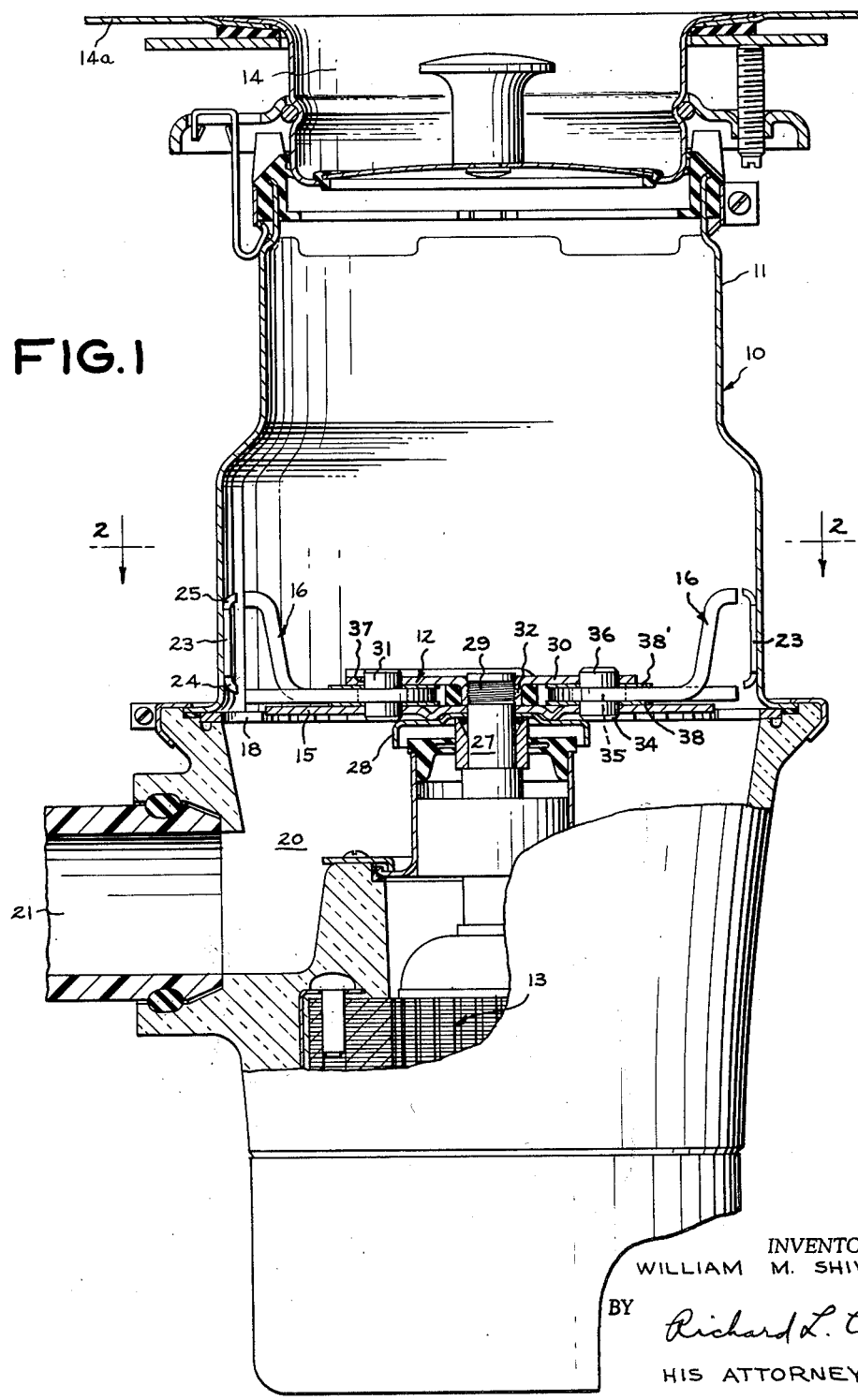
FIGURE 1 is a vertical cross-sectional view of a food waste disposer apparatus embodying the present invention.

Referring in detail to the drawings and in particular to FIGURE 1, there is shown a detailed illustration of one embodiment of the present invention applied to a food waste disposer 10 which comprises three main parts; namely, a cylindrical hopper 11, a rotatable comminuting means 12 located adjacent the bottom of the hopper, and a vertically-disposed motor 13 located beneath the comminuting means and operatively connected thereto. The upper end of the hopper 11 is designed to be suspended from the drain opening or sink flange 14 of a typical kitchen sink 14a or the like. Any suitable suspension means may be employed for this purpose, as for example the one which is illustrated; namely, the design disclosed and claimed by Johnny W. Yartz and Francis J. Clements in U.S. Patent 3,108,755, assigned to the General Electric Company, the same assignee as in the present invention. Since this suspension means does not form part of the present invention it will not be further discussed here.

The bottom of the disposer hopper 11 terminates adjacent the mid-height of the disposer. Within this lower area of the hopper there is shown a comminuting assembly 12 that includes a circular flywheel 15 and a waste impeller means mounted on the top surface of the flywheel. This waste impeller means comprises a pair of swinging impellers 16 which form the subject matter of the present invention. A detailed description of these impellers will be given later, but first more of the background information will be presented to enable a complete understanding of the environment in which the present invention is adapted to be used. The flywheel 15 cooperates with a straining ring 18 that encircles the flywheel and is fastened between the hopper 11 and the upper portion of the housing of the motor 13 as is best seen in FIGURE 1. The configuration of the straining ring 18 is best illustrated in the plan view of FIGURE 2. A large number of radial slots 19 are formed in the innermost edge of the annular straining ring 18 to provide a large number of discharge openings that will permit the comminuted waste material that is entrained in water to pass from the comminuting chamber to a sump 20 formed beneath the flywheel for discharge out of the sewer connection 21 in the side wall of the sump at will be well understood by those skilled in this art.

The electric motor 13 that is used for driving the comminuting assembly is of the type disclosed and claimed in the co-pending application of Johnny W. Yartz and Marcus P. Hogue, application Serial No. 195,210 which was filed on May 16, 1962 and is also assigned to the General Electric Company, assignee of the present invention. It should be appreciated, however, that such motor is given as an example of a preferred design and that it should not be construed as a limitation upon the invention herein. Such a motor is a series motor that has a speed of approximately 11,000 revolutions per minute. This type of motor is to be distinguished from an induction motor that has mainly been used heretofore in food waste disposer apparatus where the speed was in the order of magnitude of 1800 revolutions per minute.

This substitution of a series motor for an induction motor has changed considerably the design philosophy that has developed over the years on the basis of a relatively slow speed induction motor driven assembly. One or more grinding pads 23 are fitted to the lower portion of the inner surface of the hopper 11 for cooperation with the swinging impellers 16 of the comminuting assembly. The type of grinding pad 23 that has been illustrated is a plate-like member that is welded to the hopper wall and has its lower edge 24 folded inwardly and its upper edge 25 folded inwardly in a similar manner to provide a pair of vertically spaced and horizontally disposed cutting teeth within the comminuting chamber at the base of the hopper.

Figure 2:
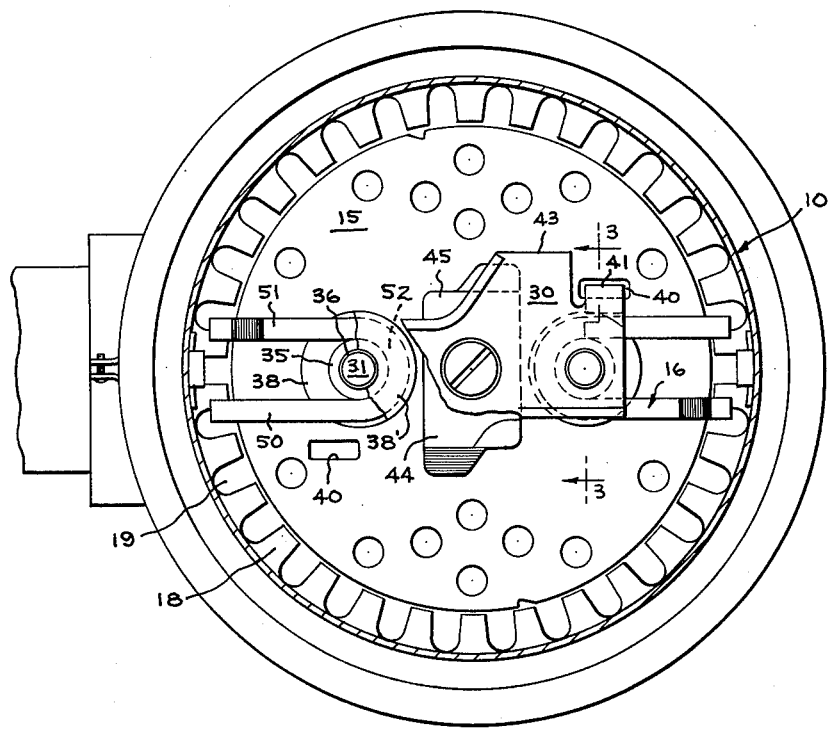
FIGURE 2 is a cross-sectional plan view of the comminuting assembly of the disposer of FIGURE 1 taken on line 2—2 thereof.
Figure 3:
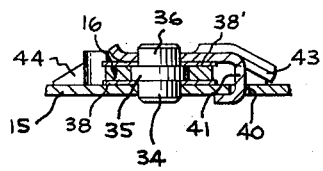
FIGURE 3 is a fragmentary cross-sectional elevational view of the pivot means of a swinging impeller taken on line 3—3 of FIGURE 2.

The flywheel 15 is attached to the upper end of an output shaft 27 of the drive motor 13. The center of the flywheel is provided with a close-fitting opening that slips over the shaft so that the flywheel is supported from a down-turned cup-like member 28 which serves as a diving bell seal for preventing water leakage into the interior of the motor 13. The upper portion of the shaft 27 that rises above the flywheel 15 is threaded as at 29 to receive a threaded retainer member 30 that serves both as a nut to fasten the flywheel to the shaft and as a means to capture a pivot pin 31 on the top surface of the flywheel and provide means for pivoting each impeller 16 to the flywheel. The retainer member 30 is a sheet metal part that has a central downturned collar 32 with internal threads for engaging the external threads 29 of the shaft. The flywheel is provided with a pair of diametrically opposed circular openings for receiving the lower portion of the pivot pin 31. The central portion 35 of the pivot pin is enlarged for cooperation with the impeller 16 which is wrapped therearound. The upper portion 36 of the pivot pin is of lesser diameter than the central portion and similar to the lower portion 34 for engagement in an opening 37 in the retainer. Accordingly, impeller 16 is fastened to the flywheel 15 by first placing a metal washer 38 over the pin-receiving opening in the flywheel. Next the pivot pin 31 is inserted through the washer and into the opening. Then the impeller 16 is located around the pivot pin and a second washer 38' is assembled onto the pivot pin and over the impeller. Finally, the retainer 30 is positioned over the central portion of the flywheel with the openings 37 fitting over the upper portions 36 of the pivot pins 31. The flywheel is also provided with a pair of diametrically opposed openings 40 as best seen in FIGURES 2 and 3. The purpose of these openings is to receive a tongue portion 41 that extends from an edge of the retainer 30 down through the opening 40 in the flywheel and is bent over so that the pivot pins 31 are captured between the flywheel and the retainer.

Finally, the flywheel is assembled to the shaft by taking the sub-assembly of the flywheel 15, retainer 30, pivot pin 31 and impeller 16 and threading this sub-assembly onto the upper end of the motor shaft 27 until the flywheel assumes the position shown in FIGURE 1. This flywheel is adapted to turn in a counterclockwise direction and the leading edge 43 of the retainer is formed downwardly to provide an inclined ramp as best seen in FIGURE 3 so that food particles will not become lodged thereunder. Moreover, a large rubber block 44 is located around the collar 32 of the retainer and it extends outwardly beyond the confines of the retainer as at 45 to serve as a resilient stop means for both swinging impellers 16 in the event the impeller strikes an immovable object and swings backwardly in a direction opposite the direction of rotation of the flywheel.

Figure 6:
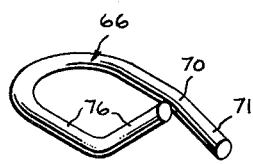
FIGURE 6 is a perspective view of a third example of a swinging impeller design embodying the present invention.
Figure 4:
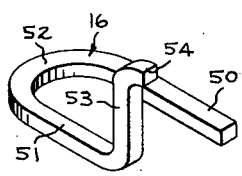
FIGURE 4 is a perspective view of a preferred embodiment of swinging impeller embodying the present invention.
Figure 5:
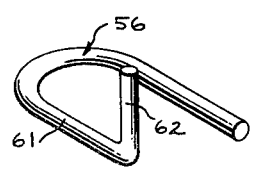
FIGURE 5 is a perspective view similar to FIGURE 4 of a modification of swinging impeller.

Turning to a consideration of FIGURE 4 there is shown a perspective view of the swinging impeller 16 illustrated in the assembly views of FIGURES 1 and 2. One of the most distinctive features of the impellers of the present invention is that they are formed of rod-like material. The metal rod may either be of square cross-section as is shown in FIGURE 4 or some similar shape such as the round cross-section as shown in FIGURES 5 and 6 although such configurations are not to be taken as limitations on the scope of the present invention. The fact is that the raw material for forming the impellers 16 is a heavy wire or slender bar or rod which comes in strip form and may be cut off into short lengths so that it may be folded in a generally hairpin shape having a pair of arms 50 and 51 which are connected together by a bight portion 52. The bight portion 52 is generally of semi-circular shape to extend around the central portion 35 of the pivot pin 31 as is best illustrated at the left side of FIGURE 2. Since the flywheel turns in a counterclockwise direction it can be seen in FIGURE 2 the the arm 50 of the impeller 16 would constitute the leading edge of the impeller, while the opposite arm 51 would constitute the trailing edge thereof. As can best be seen in FIGURE 4 the leading arm 50 has a low silhouette that is generally in the same plane as the major portion of the impeller. The trailing arm 51 has a much higher silhouette in that the distal end 53 of the trailing arm 51 is formed upwardly and the tip has a goose neck shape 54 so as to present a larger cutting area at the top of the impeller. One of the principal advantages of using the rod impellers of slender cross-section is that the cross-section is sharp enough to provide a cutting action for soft foods. The results obtained from these rod impellers have been so successful that it has been found unnecessary in some applications to provide the grinding pad 23 when only soft foods are introduced into the hopper as distinguished from the harder objects such as bones and peach pit. However, for mixed loads of a general nature it is important to utilize both the rod impeller 16 and the shredding pads 23 as shown in the assembly view of FIGURE 1.

A second modification of the impeller 16 is shown in FIGURE 5 as impeller 56. It differs from impeller 16 of FIGURE 4 mainly in that it uses round stock instead of square stock, and the trailing arm 61 has a distal end 62 that is folded up vertically and it has a plain tip. A third modification is shown in FIGURE 6 which is impeller 66 where the leading arm 70 has a backwardly inclined portion 71 at the tip thereof. The trailing arm 72 also differs in that the distal end 76 is in the same vertical plane as the arm proper and it is inclined upwardly at an angle of about 35° to have a tip at substantially the same elevation as the goose neck portion 54 of the impeller 16 of FIGURE 4.

It should be understood that while all of the modifications illustrated show impellers of generally hairpin shape having two generally parallel arms connected by a bight portion it will be recognized by those skilled in this art that other modifications can easily be conceived such as crossing over the arms to form a closed bearing around the pivot pin. Such an arrangement could easily eliminate the necessity of the large retainer 30 and necessitate a different pivot pin which would itself be fastened to the flywheel without additional means. Also, different endings for the two arms could be formed in almost an infinite number. One such ending for the trailing arm would be one that would be doubled over adjacent its distal end to have a stabilizing foot to strengthen the vertical portion thereof and perhaps prevent any permanent set taking place in such portion under extreme grinding conditions.

Modifications of this invention will occur to those skilled in this art, therefore, it is to be understood, that this invention is not limited to the particular embodiments disclosed but that it is intended to cover all modifications which are within the true spirit and scope of this invention as claimed.

What I claim as new and desire to secure by Letters Patent of the United States is:

1. In a food waste disposal apparatus having a stationary hopper enclosing a comminuting chamber, a rotatable comminuting assembly including a circular flywheel and a waste impeller means mounted on the top surface of said flywheel, the flywheel having a vertical axis of rotation and forming a bottom wall of said comminuting chamber, a drainage chamber disposed beneath said flywheel for receiving water and comminuted waste material from said hopper; the invention comprising a waste impeller means in the form of a pair of oppositely disposed swinging impellers formed of rod-like material where each impeller is formed in a generally hairpin shape with two arm portions that are joined together by a bight portion, pivot pin means fastened to the flywheel and cooperating with the bight portion, one arm of each impeller having a low silhouette while the other arm is raised upwardly at its end to present a high silhouette.

2. In a food waste disposal apparatus having a stationary hopper enclosing a comminuting chamber, a rotatable comminuting assembly including a circular flywheel and a waste impeller means mounted on the top surface of said flywheel, the flywheel having a vertical axis of rotation and forming a bottom wall of said comminuting chamber, a drainage chamber disposed beneath said flywheel for receiving water and comminuted waste material from said hopper; the invention comprising a waste impeller means in the form of a pair of oppositely disposed swinging impellers formed of rod-like material where each impeller is formed with a pair of arms that are connected together by a bight portion, pivot means fastened to the flywheel and cooperating with the bight portion so that the impeller may swing thereabout, said bight portion extending at least partially around said pivot means, said pair of arms extending from said bight portion in the same general direction, the distal end of one arm being raised above the distal end of the other arm to present both a high and a low silhouette.

3. In a food waste disposal apparatus having a stationary hopper enclosing a comminuting chamber, a rotatable comminuting assembly including a circular flywheel and a waste impeller means mounted on the top surface of said flywheel, the flywheel having a vertical axis of rotation and forming a bottom wall of said comminuting chamber, a drainage chamber disposed beneath said flywheel for receiving water and comminuted waste material from said hopper; the invention comprising a waste impeller means in the form of at least one swinging impeller formed of rod-like material into a shape having a pair of arms that are connected together by a bight portion, pivot means provided on the flywheel and cooperating with the bight portion so that the impeller may swing thereabout, said bight portion extending at least partially around said pivot means, said pair of arms extending from said bight portion in the same general direction, one arm which forms the leading edge of the impeller with relation to the direction of rotation of the impeller having a low silhouette, while the other arm of the impeller forms the trailing edge thereof and it has a distal end that is raised above the said one arm to present a high silhouette.

4. The sub-combination of an impeller means for a food waste disposal apparatus where the impeller is formed of rod material into a shape having a pair of arms that are connected together by a loop portion, said loop portion serving as a connecting means whereby the impeller may be pivotally secured to a supporting member, said pair of arms extending from said loop portion in the same general direction, one arm of the impeller forming the leading edge thereof and lying in substantially the same plane as the major portion of the impeller, the other arm of the impeller forming the trailing edge thereof and having a distal end that is raised above the first arm to present a high silhouette.

5. An impeller for a waste disposal apparatus where the impeller is formed of rod-like material having a pair of arms joined together by a bight portion, said bight portion serving as a connecting means whereby the impeller may be pivotally secured to a supporting member, said pair of arms extending from said bight portion in the same general direction, one arm having a low silhouette, while the opposite arm has a turned-up end that presents a high silhouette and has an enlarged tip.

References Cited by the Examiner
UNITED STATES PATENTS

| | | | |
|---|---|---|---|
| 2,660,210 | 11/53 | Berglind. | |
| 2,980,348 | 4/61 | Jordan | 241—194 X |
| 3,112,077 | 11/63 | Yartz | 241—275 X |

J. SPENCER OVERHOLSER, *Primary Examiner.*